United States Patent Office 3,574,061
Patented Apr. 6, 1971

3,574,061
PROCESS FOR PREPARING L-ORNITHINE BY FERMENTATION
Katsunobu Tanaka, Kazuo Ohshima, and Yoh Tokoro, Tokyo, Japan, assignors to Kyowa Hakko Kogyo Kabushiki Kaisha, Tokyo-to, Japan
No Drawing. Filed Oct. 3, 1967, Ser. No. 672,434
Claims priority, application Japan, Oct. 6, 1966, 41/65,426
Int. Cl. C21b 1/00
U.S. Cl. 195—28                                    15 Claims

ABSTRACT OF THE DISCLOSURE

The present invention is directed to a process for the preparation of L-ornithine. The compound is prepared by culturing an organism capable of producing L-ornithine in a medium where a hydrocarbon, and in particular a paraffin, is used as the main carbon source. The medium, in addition, contains a nitrogen source and the microorganism is one which is derived from a nutrient requiring strain and preferably one which is either an arginine or a citrulline requiring mutant strain. These strains are generally obtained from *Arthrobacter paraffineus*, *Corynebacterium hydrocarboclastus*, *Brevibacterium ketoglutamicum* and *Arthrobacter roseparaffinus*. The culture is preferably performed at a temperature of 25 to 40° C. at a neutral pH. After fermentation is complete the L-ornithine is separated and preferably purified.

BACKGROUND OF THE INVENTION

The present invention is concerned with a process for preparing L-ornithine by fermentation, and more particularly the present invention is concerned with a process for producing and obtaining large amounts of L-ornithine in a culture medium which contains hydrocarbons, nitrogen sources, inorganic matters etc. The compound is obtained according to the present process by culturing a microorganism which is capable of producing this compound in the particular medium described.

It is known to accumulate L-ornithine by using microorganisms. One such method is reported in Journal of General and Applied Microbiology, vol. 3,276 (1957). According to this report, an arginine-or citruline-requiring mutant strain is used for the preparation and accumulation of L-ornithine in the culture medium. This process utilizes saccharides as the sole carbon source.

GENERAL DESCRIPTION OF THE INVENTION

While studying the different modes of producing amino acids by the use of hydrocarbons, applicants have been able to culture various nutrient-requiring mutant strains of hydrocarbon-assimilable microorganism in a medium to which has been added hydrocarbons, nitrogen sources, inorganic matters etc. and because of these findings have discovered microorganisms which are capable of producing and accumulating large amounts of L-ornithine in such mediums.

The strains which can be used according to the present process belong to the arginine-requiring or the citrulline-requiring mutant strains, which can be derived from hydrocarbon-assimilable microorganisms by U.V. irradiation. The strains of this type can be exemplified by the following:

Nutrient-requiring mutant strain (2411–U–108) (ATCC 21091) of *Arthrobacter paraffineus* (ATCC 15591); nutrient-requiring mutant strain (2438–U–43) (ATCC 21093) of *Corynebacterium hydrocarboclastus* (ATCC 15592); nutrient-requiring mutant strain (2473–U–16) (ATCC 21092) of *Brevibacterium ketoglutamicum* (ATCC 15588) and nutrient-requiring mutant strain (1661–U–68) of *Arthrobacter roseparaffinus* (ATCC 15584).

Carbon sources which may be used for the medium according to the present invention include mixtures of various aliphatic hydrocarbons having from 10 to 25 carbon atoms, gaseous hydrocarbons and crude hydrocarbons such as kerosene and light oil. However, larger amounts of L-ornithine may preferably be produced by using n-paraffins having from 11 to 18 carbon atoms.

As nitrogen sources according to the present invention, various ammonium salts such as ammonium nitrate, ammonium chloride, ammonium sulfate, ammonium carbonate, ammonium phosphate etc. and mixtures thereof as well as urea may be used. Together with these materials, inorganic salts and organic nutrients can be added to the medium. Preferred organic nutritive sources include, for example, yeast extract, Nz-amine, peptone, meat extract, corn steep liquor and soybean meal hydrolysate. It is preferred to use thiamine and L-arginine when a pure chemical medium is used.

According to the present invention, fermentation should be carried out under aerobic conditions. Direct areation as by shaking or agitating the culture medium has proven to be most successful in promoting the desired result. The culture can advantageously be carried out at 25 to 40° C. It is preferred to keep the medium during cultivation at a neutral pH. For this purpose, such neutralizers as calcium carbonate, ammonia water, sodium hydroxide, ammonium carbonate etc. may be preferably used. The cultivation is usually continued for 2 to 4 days and it is thereby possible to accumulate a large amount of L-ornithine in the culture medium. After cultivation is complete, microbial bodies are separated and L-ornithine can be recovered from remaining fermentation broth, for example, by the ion-exchange treatment as described in the following example.

The following non-limitative examples illustrate the invention.

EXAMPLE 1

*Arthrobacter paraffineus* No. 2411–U–108 (ATCC 21091) (arginine-requiring strain) was cultured under agitation in a yeast bouillon medium for 24 hours to obtain a seed culture.

The composition of the fermentation medium was as follows:

0.2% $KH_2PO_4$; 0.2% $Na_2HPO_4$; 0.1% $MgSO_4 \cdot 7H_2O$; 0.005% $MnSO_4 \cdot 4H_2O$; 0.001% $FeSO_4 \cdot 7H_2O$; 0.001% $ZnSO_4 \cdot 7H_2O$; 1% $NH_4NO_3$; 0.5% Nz-amine, and 5% of a mixture of n-paraffins ($C_{12}$–$C_{14}$). pH 7.0.

(In using this medium, arginine, which was required by the strain as a nutrient, was supplied from Nz-amine.) To this fermentation medium yeast bouillon culture of the above-mentioned strain was inoculated to 5% of inoculum size. During the cultivation, aqueous ammonia was added to keep the pH within the range of from about 6 to 8.

The production of L-ornithine during the cultivation was observed to be as follows:

|  | Cultivation time, days | |
|---|---|---|
|  | 2 | 4 |
| pH | 6.8 | 6.4 |
| Amount of L-ornithine produced (mg./ml.) | 3.8 | 7.2 |

After completion of the cultivation, microbial bodies were removed, for example by filtration from one liter of the abovementioned broth and the filtrate obtained was passed through a resin column packed with weakly acidic ion exchange resin, Amberlite IRC–50 (Na-form). The L-ornithine was thereby adsorbed or fixed on the resin. The resin column was then washed with water, and L-ornithine was eluted with 1 N hydrochloric acid. The fractions, which exhibited a positive ninhydrin reaction, were combined and concentrated under reduced pressure at a temperature below 40° C. After decolorizing with active carbon, the concentrate, which yielded 5.6 grams of crude crystal of L-ornithine was mixed with alcohol.

EXAMPLE 2

A yeast bouillon culture (cultured for 24 hours at 30° C.) of *Corynebacterium hydrocarboclactus* No. 2438-U-43 (ATCC 21093) (arginine-requiring strain) was used as the seed. A similar medium to that as described in Example 1, with the exception that 5% of the mixture of n-paraffins was replaced by 5% of light oil, was used. The aerated mixture was permitted to culture for 4 days and in a similar manner to that described in Example 1. The amount of bouillon culture inoculated was the same as in Example 1. The amount of L-ornithine after completion of the fermentation was 3.2 mg./ml.

EXAMPLE 3

*Brevibacterium ketoglutamicum* No. 2473-U-16 (ATCC 21092) (arginine-requiring strain) was used. This strain was produced in a manner similar to that described in Example 1. Cultivation was carried out as described in Example 1 with the exception that 0.5% of yeast extract was replaced for 0.5% of Nz-amine. After 4 days, 8.6 mg./ml. of L-ornithine were obtained.

Having thus described the invention, it is apparent that certain obvious modifications can be made thereto without deviating from the scope of the invention and it is clearly intended that these modifications be part of the invention.

EXAMPLE 4

A strain (1661-U-68) of *Arthrobactar roseoparaffinus* (ATCC 15584) was used. Cultivation was carried out in a similar manner to that described in Example 1 except that an equal weight of yeast extract replaced the Nz-amine. After 4 days, 5.5 mg./ml. of L-ornithine were obtained.

We claim:
1. A process for preparing L-ornithine which comprises culturing a microorganism which is an arginine or citrulline-requiring mutant strain derived from a bacteria selected from the group consisting of *Arthrobacter paraffineus, Corynebacterium hydrocarboclastus, Brevibacterium ketoglutamicum*, and *Arthrobacter roseoparaffinus* and capable of producing L-ornithine in a culture medium containing a hydrocarbon as the main carbon source until said L-ornithine is produced and recovering the same.

2. The process of claim 1 wherein the microorganism is selected from the group consisting of *Arthrobacter paraffineus* ATCC 21091, *Corynebacterium hydrocarboclastus* ATCC 21093, and *Brevibacterium ketoglutamicum* ATCC 21092.

3. A process according to claim 1 wherein the microorganism is cultured at about 25 to 40° C. and at a neutral pH.

4. A process according to claim 1 wherein the hydrocarbon is a mixture of hydrocarbons having from 10 to 25 carbon atoms.

5. A process according to claim 4 wherein the hydrocarbon is a n-paraffine having from 11 to 18 carbon atoms.

6. A process according to claim 5 wherein the medium also contains a material which acts as a nitrogen source.

7. A process according to claim 6 wherein the material is selected from the group consisting of a nitrogen salt and urea.

8. A process according to claim 7 wherein the material is a nitrogen salt and is selected from the group consisting of ammonium nitrate, ammonium chloride, ammonium sulfate, ammonium carbonate, ammonium phosphate and mixtures thereof.

9. A process according to claim 8 wherein the microorganism is cultured at about 25 to 40° C. and at a neutral pH.

10. A process according to claim 9 wherein the medium contains in addition to said hydrocarbon and said nitrogen source additional nutritive sources selected from the group consisting of yeast extract, peptone, meat extract, corn steep liquor, soybean meal, hydrolysate and mixtures thereof.

11. A process according to claim 9 wherein the L-ornithine is recovered from the culture medium by filtering the medium and collecting the filtrate containing the L-ornithine.

12. A process according to claim 11 wherein the L-ornithine is purified by (i) passing the filtrate through an acidic ion exchange resin, (ii) washing the resin with water and (iii) eluting the fixed L-ornithine from the resin with acid.

13. A process according to claim 12 wherein the nutrient requiring mutant strains of the respective bacteria are derived by culturing said bacteria in a yeast bouillon until a seed culture of said strain is obtained.

14. A process according to claim 13 wherein the yeast bouillon culture of said strain is inoculated to 5% of inoculum size in said medium.

15. A process according to claim 14 wherein the strain is an arginine requiring strain derived from *Arthrobacter paraffineus* and said arginine is supplied by Nz-amine.

References Cited

UNITED STATES PATENTS 2,988,489   6/1961   Kinoshita et al. _____ 195—47
3,222,258   12/1965  Iizuka et al. _____ 195—3

A. LOUIS MONACELL, Primary Examiner

G. M. NATH, Assistant Examiner